United States Patent [19]
Weber, Jr.

[11] 3,876,904
[45] Apr. 8, 1975

[54] LIGHT SWITCH CONTROL

[75] Inventor: G. Donald Weber, Jr., Villa Park, Calif.

[73] Assignee: Rockwell International Corporation, El Segundo, Calif.

[22] Filed: Jan. 28, 1974

[21] Appl. No.: 437,593

[52] U.S. Cl. .................................. 315/93; 315/82
[51] Int. Cl. ....................................... H05b 41/46
[58] Field of Search ............ 315/90, 91, 92, 93, 83, 315/82

[56] References Cited
UNITED STATES PATENTS

| | | | |
|---|---|---|---|
| 3,397,342 | 8/1968 | Dill, Jr. .......................... | 315/82 X |
| 3,402,321 | 9/1968 | Tagawa ........................... | 315/82 X |
| 3,702,415 | 11/1972 | Schultz ........................... | 315/83 X |
| 3,818,267 | 6/1974 | Hill et al. ....................... | 315/82 |

Primary Examiner—Nathan Kaufman
Attorney, Agent, or Firm—H. Frederick Hamann; G. Donald Weber, Jr.

[57] ABSTRACT

A circuit for causing the headlights of a vehicle to be turned on when a vehicle with the parking lights turned on is put in motion.

4 Claims, 1 Drawing Figure

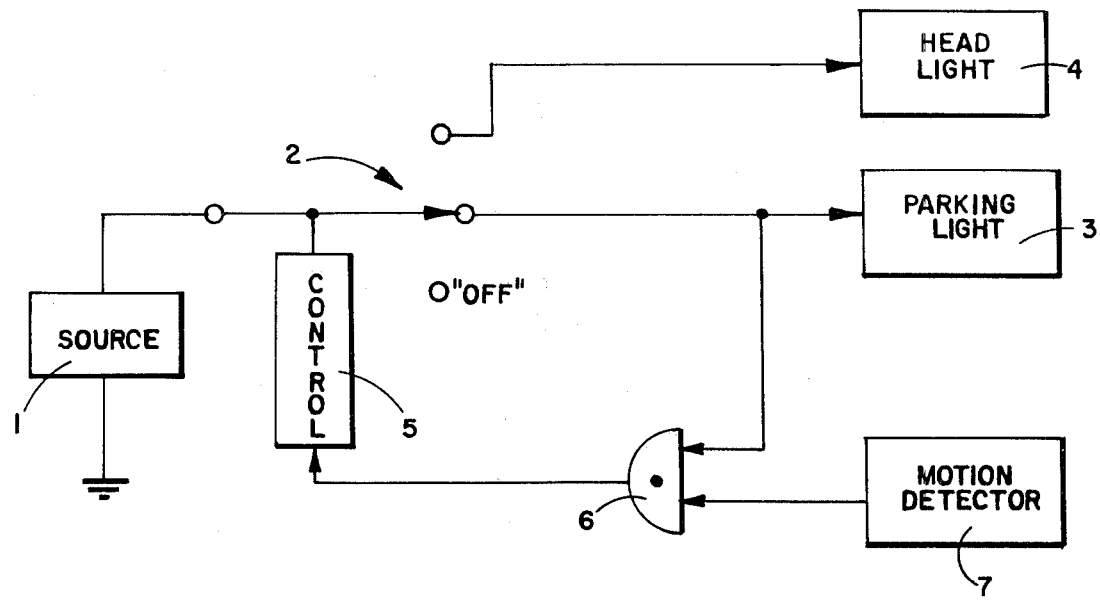

LIGHT SWITCH CONTROL

BACKGROUND OF THE INVENTION

1. Field of Invention

This invention relates to a control circuit for use with vehicles and provides a safety feature therefor.

2. Background and Prior Art

It is well known that many vehicle operators tend to use the parking lights (as opposed to the headlights) of the vehicle at dusk. The obvious consequence is that the operator continues to operate the vehicle with only the parking lights operative even after dark. That is, when the parking lights are operative the dashboard lights are usually operative and the vehicle operator is misled into believing that he has adequate external lighting.

The difficulties and obvious safety problems are many. For example, the driver or operator leaves a well lighted roadway for a less well lighted roadway and is suddenly confronted with a poor visibility situation. The obvious difficulties are apparent. Conversely, the same vehicle with only parking lights is difficult to observe and to judge as to speed, distance and so forth for approaching vehicles.

Moreover, many states have made it unlawful to operate a vehicle using only parking lights after dark. These states have recognized the obvious safety hazards involved.

Unfortunately, virtually every vehicle on the road today has a separate parking light system and headlight system. While recent safety regulations have required that the parking lights remain on when the headlights are turned on, there is not established system for rectifying the problems which occur when the operator tries to operate a vehicle with only parking lights operative.

The best known reference is U.S. Pat. No. 3,774,071, Headlight Control, to R. E. Goodrich. However, this patent is limited to a system wherein the headlight system is rendered operative whenever the vehicle is operative. This includes standing with the engine idling, daylight driving and the like.

SUMMARY OF THE INVENTION

This invention relates to a control system which detects the motion of the vehicle and the concurrent operation of a parking light circuit. The circuit system then causes the activation of the headlight circuit. The control system is established to be operative only when both of the aforesaid conditions, i.e., motion of the vehicle and parking light operation have been detected.

BRIEF DESCRIPTION OF THE DRAWINGS

FIG. 1 is a block diagram of a preferred embodiment of the invention.

DESCRIPTION OF THE PREFERRED EMBODIMENT

Referring now to the single FIGURE, source 1 supplies energy to the system. This source may be a standard battery such as 6 or 12V battery as is conventional in most vehicles. Of course, the energy source may be a generator or any other suitable source known or devised for vehicles. The source is shown connected between a suitable reference potential such as ground and one terminal of switch 2. Switch 2 is any conventional switch which is used in the vehicle for controlling the light system. As shown in this embodiment, switch 2 has three positions. The positions are the "OFF" position, "PARKING LIGHT" position, and the "HEADLIGHT" position. When switch 2 is in the OFF position, source 1 is disconnected from any of the lights discussed hereinafter. When switch 2 is in the PARKING LIGHT position, source 1 is connected via switch 2 to parking light 3. Parking light 3 is any suitable parking light system used in any conventional vehicle. Parking light 3 may represent one light or a plurality of lights which are interconnected in a suitable arrangement. While not shown, a return path to source 1 is provided through the reference potential or through a common ground as is well known in the art. Likewise, when switch 2 is connected to the HEADLIGHT position, source 1 is connected through switch 2 to headlight 4 whereupon headlight 4 is activated. Again, headlight 4 is returned to switch 1 in the conventional connection manner.

Thus far, the lighting system described is substantially similar to conventional systems. That is, source 1 is electrically connected to parking light 3 or headlight 4 (or to the OFF position) via switch 2. In the conventional system, when switch 2 is in the HEADLIGHT position, headlight 4 is energized. Conversely, when switch 2 is in the PARKING LIGHT position, parking light 3 is energized. However, no interaction between these conditions exist. Thus, if the operator of a vehicle places switch 2 in the PARKING LIGHT position, parking light 3 will be energized and remain energized unless and until the position of switch 2 is manually altered by the operator.

In the system which forms the subject of this invention, a motion detector 7 of suitable design is provided. An output terminal of motion detector 7 is connected to one input terminal of AND gate 6. Another input terminal of AND gate 6 is connected to the PARKING LIGHT terminal of switch 2.

The output terminal of AND gate 6 is connected through a suitable control device 5 to switch 2. In particular, control device 5 is connected to switch 2 through a mechanical, electromechanical or electronic arrangement whereby control device 5 will alter the effective position of switch 2. For example, but not limited thereto, control device 5 may represent a solenoid which has a plunger thereof in engagement with the armature of switch 2 whereby activation of solenoid 5 causes the armature of switch 2 to be moved from the PARKING LIGHT position to the HEADLIGHT position.

Control device 5 receives a control signal from AND gate 6. AND gate 6 is designed to produce an output signal, if and only if, the input signals thereto are of the same type. For example, if both signals are positive, AND gate 6 will produce an output signal which will drive the control device 5.

Motion detector 7 may be any suitable type of motion detector which may be known in the art. For example, some motion detectors which are contemplated include a magnet mounted in a wheel, drive shaft or other component of an automobile which will rotate upon motion of the vehicle. A reed relay located adjacent to the magnet will be selectively closed when the magnet moves adjacent to the reed. Closure of the relay will supply a signal to gate 6. If switch 2 is in the PARKING LIGHT position, another input signal will be supplied to gate 6. The concurrent application to the input terminals of AND gate 6 will produce an output signal which will operate control device 5. Obviously, if the car is stationary and no signal is produced by motion detector 7 or parking light 3 is not operative (i.e., switch 2 is in the OFF or HEADLIGHT position) gate 6 will not supply a control signal to control device 5.

In operation then, if switch 2 is in the OFF or HEADLIGHT position, the circuit is substantially overriden. Typically, if switch 2 is in the OFF position, external lights are not necessary and this circuit should not be operative. Conversely, if switch 2 is in the HEADLIGHT position, headlight 4 is already turned on and the necessity of operation of the circuit is eliminated. However, if switch 2 is in the PARKING LIGHT position, parking light 3 is operative. So long as the car is in a parked or stationary condition, a signal from only the parking light is applied to gate 6. Consequently, gate 6 does not produce a signal which is supplied to control device 5.

However, as soon as a vehicle is placed in motion and motion detector 7 is operative, a signal is applied to the other terminal of gate 6. The concurrent application of these signals causes gate 6 to supply a control signal to control device 5. Control device 5 then is operative to cause switch 2 to switch from the PARKING LIGHT position to the HEADLIGHT position wherein headlight 4 is turned on. Of course, parking light 3 may be retained in the ON condition in accordance with typical circuitry currently utilized.

Thus, there has been shown and described a preferred generic embodiment of the invention. Modifications to this current for specific implementation thereof may be suggested by those skilled in the art. For example, motion detector 7 may be an inertia detector switch or the like. Moreover, motion detector 7 may include therein a one-shot multivibrator circuit, or a bistable circuit or the like. These latter circuits would be energized by a single pulse from motion detector 7 to produce a relatively long pulse to the appropriate input of gate 6. Conversely, if gate 6 is produced in such a manner as to operate upon and respond to a signal from switch 2 in the PARKING LIGHT position and a high speed signal from motion detector 7, control device 5 may include an energy storage or latching element or the like to operate upon a high speed signal from gate 6.

Moreover, switch 2 and control device 5 need not be mechanically or electromechanically connected. In fact, it is contemplated that gate 6 and control device 5 may be fabricated by standard semiconductor techniques and be incorporated into a single MOS/LSI chip component or the like.

Thus, there has been shown and described a preferred embodiment of the invention. It is suggested that modifications to this embodiment may be suggested to those skilled in the art. However, any such modifications which fall within the purview of the description are intended to be included therein. The description is meant to be illustrative only and not to be limitative. The scope of the invention is limited only by the claims appended hereto.

What is claimed is:

1. In combination with a vehicle having at least two sets of lights,
    source means,
    first and second light means,
    switch means for selectively connecting said source means to one of said light means,
    control means coupled to said switch means to control the operation thereof, and
    condition responsive means connected to said control means to selectively cause operation of said control means, said condition responsive means including
    motion detector means for detecting motion of said vehicle and producing a signal indicative thereof,
    logic means having first and second input terminals and an output terminal,
    said first input terminal connected to said motion detector means,
    said second input terminal connected to said one of said first and second light means,
    said output terminal connected to said control device,
    said logic means arranged to produce a signal representative of the signals supplied thereto by said motion detector means and said one of said first and second light means,
    said control means arranged to produce an output representative of the signal produced by said logic means whereby the condition of said switch means is controlled so that the other one of said light means is selectively connected to said source means only when said vehicle is in motion and said switch means is connected to said one of said light means concurrently.

2. The combination recited in claim 1 wherein said source means comprises a battery.

3. The combination recited in claim 1 wherein said logic means comprises an AND gate.

4. The combination recited in claim 1 wherein said first light means comprises the headlight system,
    said second light means comprises the parking light system, and
    said one light means is said second light means.

* * * * *